United States Patent [19]

Franke et al.

[11] Patent Number: 4,889,908

[45] Date of Patent: Dec. 26, 1989

[54] POLYETHERS AND THEIR USE AS MOLD RELEASE AGENTS FOR PLASTICS

[75] Inventors: Joachim Franke, Cologne; Wilhelm Goyert, Leverkusen; Helmut Kipphardt, Cologne, all of Fed. Rep. of Germany

[73] Assignee: Bayer Aktiengesellschaft, Bayerwerk, Fed. Rep. of Germany

[21] Appl. No.: 250,453

[22] Filed: Sep. 28, 1988

[30] Foreign Application Priority Data

Oct. 6, 1987 [DE] Fed. Rep. of Germany ....... 3733752

[51] Int. Cl.$^4$ ............................................. C08G 18/14
[52] U.S. Cl. ..................................... 521/115; 521/116; 521/174; 524/100; 524/377; 524/720; 524/762; 544/383; 544/401; 568/620
[58] Field of Search ...................... 521/115, 116, 174; 524/100, 377, 720, 762; 544/383, 401; 568/620

[56] References Cited

U.S. PATENT DOCUMENTS

| | | | |
|---|---|---|---|
| 3,436,163 | 9/1986 | Weber et al. | 521/117 |
| 3,817,900 | 6/1974 | Higuchi et al. | 260/30.4 |
| 3,925,527 | 12/1975 | Kleimann et al. | 264/53 |
| 4,201,847 | 5/1980 | Kleimann et al. | 521/172 |
| 4,481,123 | 11/1984 | Hentschel et al. | 252/52 |

*Primary Examiner*—Maurice J. Welsh
*Attorney, Agent, or Firm*—Joseph C. Gil; Thomas W. Roy

[57] ABSTRACT

The present invention is directed to polyethers obtained by the reaction of a substituted 1,2-epoxy-alkane bearing at least one alkyl substituent containing at least 8 carbon atoms with at least one polyol corresponding to the formula $$R(OH)_x \qquad (1)$$

wherein
  R is an organic radical and
  x is an integer having a value of 2 or more,
  2 or more moles of epoxyalkane being added onto the polyol (1).

The present invention is also directed to a process for the preparation of high molecular weight polymers wherein the process is conducted in the presence of the previously described polyethers as a mold release agent.

10 Claims, No Drawings

POLYETHERS AND THEIR USE AS MOLD RELEASE AGENTS FOR PLASTICS

BACKGROUND OF THE INVENTION

1. Field of the Invention

This invention relates to new mold release agents for synthetic resins or plastics, preferably polycondensates and polyaddition compounds and especially polyurethanes.

2. Description of the Prior Art

The mold release agents according to the invention also act as lubricants in the production of plastics. Lubricants for synthetic resins generally bring about an improvement in the flow behavior of the plastics and prevent the plastics from sticking or adhering to parts of the processing and production machinery. Accordingly, they are crucially important in improving the molding properties and processing properties of plastics and represent an indispensable additive, particularly for the processing of thermoplastic polyurethanes or polyurethane ureas.

In almost every process, a mold release agent has to be used to prevent the moldings from adhering to the mold walls. In one method, the molds are carefully coated with a thin film of the release agent before the polyurethane composition is introduced. Waxes, soaps or oils are normally used. Although these so-called "external" release agents are effective, they have to be applied in a separate operation, during which the mold has to be taken out of production. Exact dosage of the release agent is often difficult because the release agent is applied by spray-coating or spread-coating and does not completely fill complicated molds, i.e. for example molds which have been finely engraved.

The difficulties mentioned above, which occur in particular in the case of polyurethanes (other plastics, for example polyolefins, present no mold release problems even without release agents), have resulted in the developement of "internal" release agents which consist mainly of fatty acid derivatives. The fatty acid derivatives are added to the polyurethane composition and provide for smooth removal of the part to be produced from the mold. However, the usefulness of internal release agents in automatic molding processes is limited because a buildup of the release agent occurs after several cycles so that the process has to be interrupted. "Internal" release agents of the type in question for polyurethanes are described, for example, in DE-A-2,307,589, DE-A-2,319,648.

Examples of state-of-the-art "internal" release agents include natural and synthetic fatty acid derivatives. Amides of $C_8$–$C_{20}$ monocarboxylic acids (such as dodecylamide, decylamide, oleylamide or stearylamide) in quantities of about 0.3 to 5% are particularly suitable. Equally suitable are diamides of aliphatic monocarboxylic acids containing more than 9 carbon atoms and aromatic aliphatic diamines such as phenylene-bis-palmitylamide or ethylene-bis-stearylamide. Further examples include esters of fatty acids, preferably containing more than 10 carbon atoms, such as palmitic acid methylester or stearic acid butyl ester and also glycerides of carboxylic acids containing more than 8 carbon atoms. Polyethylene waxes and synthetic waxes, montan waxes and mixtures thereof may also be used. 0.3 to 5% by weight (based on polyurethane solids) of derivatives of fatty acids containing more than 12 carbon atoms, for example esters or amides of fatty acids are preferably used as lubricants. Metal soaps, for example, magnesium, calcium, zinc and aluminum stearates, are also used as lubricants. However, the disadvantage of the release agents mentioned above is due to their pronounced tendency to exude or effloresce.

The release agents naturally exert their releasing effect only on that surface of the product to which they migrate due to their incompatibility with the polyurethane. The releasing effect generally increases with the release agent content, relatively high concentrations leading to an undesirable gray bloom on the surface of the product which, although removable by wiping, increases in intensity or recurs in the event of prolonged storage. In polyurethane (polyurea) granulate stored for long periods before further processing, the concentration of release agent at the surface can become so great that the product cannot be uniformly taken in by an extruder. In addition, the concentration of release agent at the surface is always at its lowest just when an optimal releasing effect is required, i.e., in the freshly molded part. Thus, the effect of a large part of the release agent added is merely the unwanted optical surface phenomenom. In addition, in the case of composite materials, the exuded release agent can damage the other material. The object of the present invention is to provide improved and, above all, nonefflorescing mold release agents.

SUMMARY OF THE INVENTION

The present invention is directed to polyethers obtained by the reaction of a substituted 1,2-epoxy-alkane bearing at least one alkyl substituent containing at least 8 carbon atoms with at least one polyol corresponding to the formula $$R(OH)_x \quad (1)$$

wherein
R is an organic radical and
x is an integer having a value of 2 or more,
2 or more moles of epoxyalkane being added onto the polyol (1).

The present invention is also directed to a process for the preparation of high molecular weight polymers wherein the process is conducted in the presence of the previously described polyethers as a mold release agent.

DETAILED DESCRIPTION OF THE INVENTION

In a preferred embodiment, the epoxyalkane corresponds to the formula

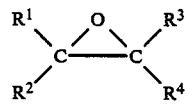
(2)

wherein $R^1$ to $R^4$ may be the same or different and represent H or an alkyl radical, at least one of the substituents $R^1$ to $R^4$ being a linear alkyl radical containing at least 8, preferably 8 to 42 carbon atoms.

In another preferred embodiment, at least one of the substituents $R^1$ to $R^4$ contains at least 10, preferably at least 20 carbon atoms.

In radical R in the polyol formula (1) may be a (cyclo)aliphatic, aromatic or heterocyclic radical or an alkylaryl or arylalkyl radical. Preferred (cyclo)aliphatic radicals contain at least 2, more preferably 4 to 12 carbon atoms. Preferred aliphatic radicals R include ethylene, 1,2- or 1,3-propylene, 1,2-, 1,3-, 1,4- or 2,4-butylene, pentylene, hexylene and cyclohexylene. Other preferred polyols (1) include glycerol, trimethylolpropane and pentaerythritol. Preferred aromatic radicals include phenylene and naphthylene. Preferred heterocyclic radicals R include

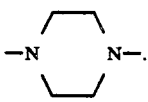

Preferred alkylaryl or arylalkyl radicals R include xylylene,

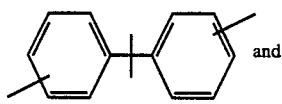 and

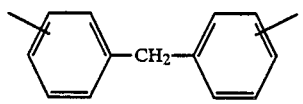

Particularly preferred polyols of formula (1) include hexanediol and trimethylolpropane.

Particularly preferred compounds obtainable in accordance with the invention correspond to the formula

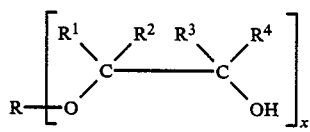

wherein
R and $R^1$ to $R^4$ are as defined above and
x is an integer of two or more, preferably 2.

Other possible substituents of the radicals R are other radicals which can be formed in the reaction between the above-defined epoxyalkane and the polyol (1) in the event of a non-equimolar reaction include OH or radicals corresponding to the formula

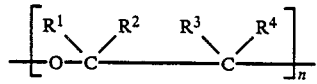

Preferred epoxyalkanes include dec-1-ene oxide, dodec-1-ene oxide, tetradec-1-ene oxide, hexadec-1-ene oxide, heptadec-1-ene oxide, octadec-1-ene oxide, tetracos-1-ene oxide, pentacos-1-ene oxide, hexacos-1-ene oxide, heptacos-1-ene oxide, octacos-1-ene oxide, etc.

These epoxies may be synthesized by the reaction of $C_8$–$C_{42}$-olefins (obtained by cracking higher paraffin waxes or oligomerizing ethylene by conventional methods) with hydrogen peroxide or an organic per acid. The epoxides may also be prepared by chlorohydrin synthesis.

These methods for the synthesis of the epoxides are described in principle in the literature, cf. for example D Swern et al in J. Am. Chem. Soc. 68, 1501 (1946); Chem. Rev. 45, (1949); Org. Reaction 7, 378 (1953); H. C. Wohlers et al in Ind. Eng. Chem., 50, 1685 (1958); Masuo and Kato in Org. Synth. Chem. (Japan), 26, 367 (1968) Takagi et al in Bulletin Ind. Chem. (Japan), 69, 1080 (1966); 70, 1446 (1967) and Oil Chem. (Japan), 16, 462 (1967).

Preferred polyols (1) include ethylene glycol, propylene glycol, butanediol, pentanediol, hexanediol, etc.; glycerol, trimethylolpropane, etc.; and pentaerythritol.

The polyethers according to the invention are preferably prepared by reaction of the epoxides with the alcohols in the melt or in an inert organic solvent at an elevated temperature of about 60° to 200° C., preferably about 100° to 180° C. in the presence of an acidic or alkaline catalyst. The reaction is complete when no more epoxide groups can be detected by analysis. The catalyst may be separated off by filtration or washing, optionally after neutralization. However, this is only necessary when the residues of catalyst in the polymer produce undesirable effects.

The present invention is also directed to the use of the compounds according to the invention as mold release agents or lubricants (high MW polymers) for plastics, preferably polycondensation or polyaddition polymers, more preferably polyurethane ureas or polyureas and most preferably polyurethane or polyurea elastomers.

The present invention is finally directed to a process for the production of (thermoplastic) polyurethane or polyurea elastomers (including foamable types), characterized in that the polymers are formed by reacting (A) substantially difunctional compounds of relatively high molecular weight containing two zerewitinoff-hydrogen atoms and having a molecular weight of 400 to about 20,000, preferably polyhydroxyl compounds, (B) substantially bifunctional chain-extending agents such as diols or diamines having a molecular weight of 32 to 399, preferably 62 to 200 and (C) organic diisocyanates preferably aromatic diisocyanates, especially diphenylmethane-4,4'-diisocyanate containing up to about 5%, preferably up to about 3% of diphenylmethane-2,4'-diisocyanate,
the molar ratio of the diisocyanate (C) to diols (A) and (B) being about 0.9 to 1.2:1, preferably 0.9 to 1.1:1, (D) with the addition of about 0.05% to 5%, preferably about 0.1% to 2% of the release agents according to the invention and (E) optionally with the addition of stabilizers and other additives known per se.

Suitable starting components for the production of the polyurethanes are the reactants and auxiliaries known in the art. The processes and apparatus which may be used are also known.

Thus, the substantially linear compounds (A) of relatively high molecular weight containing essentially two zerewitinoff-active hydrogen atoms include the isocyanate-reactive compounds from known polyurethane chemistry and containing two reactive groups such as hydroxyl, primary and/or secondary amino, SH, carboxyl and hydrazide groups. Examples include substantially difunctional hydroxypolyesters, hydroxypolylactones, hydroxypolyethers, hydroxypolythioethers, hydroxypolyester amides, hydroxypolycarbonates, hydroxyacetals, vinyl polymers containing hydroxyl groups or other terminal groups and compounds containing urethane and/or urea groups. These compounds correspond to the prior art and are described in detail, for examples, in DE-OS 2,302,564, 2,423,764, 2,549,372

(U.S.-PS No. 3,963,679), DE-OS 2,402,840 (U.S.-PS No. 3,984,607) DE-AS 2,457,387 (U.S.-PS No. 4,035,213) and in DE-OS 2,854,394 and 2,920,501, the preceding U.S. patents are herein incorporated by reference.

The compounds are preferably relatively high molecular weight compounds containing hydroxyl groups for example polyester diols of linear or branched, aliphatic and/or cycloaliphatic diols and aliphatic dicarboxylic acids, especially adipic acid. However, small quantities of aromatic dicarboxylic acids may also be used, especially phthalic acid, terephthalic acid and hydrogenation products thereof. Also suitable are hydroxypolycarbonates, hydroxypolycaprolactones and hydroxypolyether diols based on ethylene oxide, propylene oxide, tetrahydrofuran or mixed polyesters of propylene oxide, ethylene oxide and/or tetrahydrofuran.

Relatively high molecular weight polyamino compounds, preferably containing primary aromatic amino groups, may also be used. Preferred polyamino compounds are prepared, for example, by (preferably basic) hydrolysis of the corresponding NCO prepolymers based on polyhydroxy compounds of relatively high molecular weight and excess aromatic diisocyanates. Examples of these processes can be found in DE-OS 2,948,419, DE-OS 3,039,600, DE-OS 3,112,118, EP-A-61,627, EP-A-71,132, and EP-A-97,869. The first of these patent specifications also mentions other state-of-the-art processes for the production of aromatic amino compounds of relatively high molecular weight of the type suitable for the process according to the invention. Other production processes are described in DE-AS 1,694,152, FR-PS 1,415,317 or DE-AS 1,155,907.

Particularly preferred polyols (A) are adipic acid polyesters, caprolactone diols or polycarbonate diols, optionally in admixture with polyethers. Adipic acid polyesters prepared from butane-1,4-diol and/or hexane-1,6-diol are especially preferred.

The chain-extending agents (B) suitable for use in accordance with the invention are known per se and are described, for example, in DE-OS 2,302,564, 2,423,764, 2,549,372, 2,402,840, 2,457,378 and 2,854,384 and in U.S. Pat. No. 4,218,543, herein incorporated by reference in its entirety. Examples of chain-extending agents in question include low molecular weight polyalcohols preferably diols) and diamines (especially (cyclo)aliphatic diamines). Suitable diamines include 4,4'-diaminodicyclohexylmethane, isophoronediamine, ethylene diamine and 1,3- or 1,4-diaminocyclohexane. Preferred chain-extending agents include diols such as ethylene glycol, hexane-1,6-diol and hydroquinone di-$\beta$-hydroxyethyl ether. Particularly preferred chain-extending agents include butane-1,4-diol, optionally in admixture with other diols, especially hexane-1,6-diol. The molecular weight of the chain-extending agent is in the range from 32 to 399, preferably in the range from 62 to about 220.

Small quantities, for example about 0.01 to 3% by weight, based on polyurethane solids, of monofunctional compounds may also be used as chain terminators. Examples of such compounds include monoalcohols (such as butanol, 2-ethylhexanol, isobutyl alcohol, 1-octanol and stearyl alcohol) or monoamines (such as aniline, dibutylamine, N-methyl stearylamine or piperidine).

Diisocyanates (C) suitable for use in accordance with the invention include aliphatic, cycloaliphatic, araliphatic, aromatic or heterocyclic diisocyanates known from the prior art. They are listed in detail in the publications cited with reference to compounds (A) and (B). Diisocyanates preferably used in accordance with the invention include hexamethylene diisocyanate, isophorone diisocyanate, naphthylene-1,5-diisocyanate, tetramethyl xylylene diisocyanate, 3,3'-dimethyl-4,4'-diisocyanatodiphenyl (TODI), 1,4-diisocyanatobenzene and the corresponding hydrogenated product, toluylene diisocyanate and, in particular, the diphenylmethane diisocyanate isomers and their corresponding hydrogenated products. Particular preference is attributed to 4,4'-diisocyanatodiphenylmethane or its isomer mixture with up to about 5 mole %, preferably up to about 3 mole % of 2,4'-diisocyanatodiphenylmethane and very small quantities of the 2,2'-diisocyanatodiphenylmethane isomer.

The diisocyanates mentioned may optionally be used together with up to about 15 mole %, based on diisocyanate, of a polyisocyanate of higher functionality. However, the quantity in which the higher polyisocyanate is used should be limited in such a way that a still fusible or thermoplastic polyurethane elastomer is obtained. A relatively large quantity of such polyisocyanates should generally be counterbalanced by the use of, on average, less than difunctional hydroxyl or amino compounds or monoisocyanates so that excessive chemical crosslinking of the product is avoided. Examples of such polyisocyanates and monofunctional compounds can also be found in the prior art cited above. Monoamines such as butyl or dibutylamine, hydroxylamine, stearylamine, N-methylstearylamine, pyrrolidone or tetrahexylamine or butanone oxime, and monoalcohols such as 1-butanol, 2-ethyl-1-hexanol, 1-dodecanol, isobutanol or tert.-butanol, cyclohexanol or ethylene glycol monomethyl ether are mentioned as examples. The use of these compounds is not preferred.

The polyurethane reaction may of course be carried out in the presence of known catalysts, release agents, antistatic agents, flameproofing agents, fillers, glass fibers and colorants. (cf. for example DE-OS 2,854,409, DE-OS 2,920,501 and DE-S 3,329,775).

Suitable catalysts include tertiary amines and organometallic compounds (especially organic tin, lead and titanium compounds) such as tin(II) acetate, tin(II) ethylhexoate, dibutyltin dilaurate or lead acetate.

In the process according to the invention, the quantities of reaction components (A) to (C) for the polyurethanes are generally selected so that the NCO:OH equivalent ratio is between about 0.9 and 1.2, preferably about 0.96 and 1.04.

The compounds according to the invention show superior mold release properties. They do not affect the properties of the plastics in which they are incorporated, especially not by phase separation or other incompatibility, and show distinctly improved properties in relation to the compounds known from DE-A-2,165,749 (see Examples) which are prepared by addition of only one epoxide. They differ from the compounds known from DE-A-3,117,839, 3,117,840, 3,117,841 and 3,210,283 in that the latter have to be copolymerized in the presence of ethylene oxide, propylene oxide, butylene oxide and/or tetrahydrofuran and are present as oils. By contrast, the compounds according to the invention are preferably solids having a melting point above 30° C. In addition, the prior art oils have a considerably higher degree of polymerization and, associated therewith, a longer chain between the terminal OH atoms.

It is surprising that the hydroxyfunctional polyethers according to the invention act as mold release agents although they are incorporated in the polymer through the OH groups. This is surprising above all because other conventional chemically incorporated release agents (for example DE 3,436,163) fall off strongly in their release effect.

The invention is further illustrated but is not intended to be limited by the following examples in which all parts and percentages are by weight unless otherwise specified.

EXAMPLES

Example 1

Reaction of the epoxides with diol or triol

The alcohols and epoxides were melted. Approx. 0.5 g Na was added at 110° C. and the mixture was stirred under nitrogen for 10 to 12 hours at 120° to 190° C. until all the epoxide groups had reacted off. An equivalent quantity of 1N HCl was then added at 60° C. for neutralization and the water was distilled off in vacuo. The product was freed from sodium chloride by filtration at 60° to 80° C.

Instead of elemental sodium, it is also possible to use an equivalent quantity of sodium methylate or sodium hydroxide. In this case, however, the methanol or $H_2O$ must be removed before the epoxide is added. An equivalent quantity of dilute sulfuric acid may also be used in place of hydrochloric acid. The product may also be freed from the salt formed by dissolution in xylene or toluene, repeated washing with water at 20° to 80° C., subsequent phase separation and, finally, removal of the solvent.

A white or light yellowish, wax-like product was obtained.

The individual products are shown in the following Table.

TABLE I

| No. | Alcohol | g | Expoxide | g | OH Value |
|---|---|---|---|---|---|
| 1[1] | hexanediol | 118 | octadec-1-ene oxide | 268 | 295 |
| 2 | hexanediol | 118 | dodec-1-ene oxide | 368 | 253 |
| 3 | hexanediol | 118 | hexadec-1-ene oxide | 480 | 199 |
| 4 | hexanediol | 118 | octadec-1-ene oxide | 536 | 175 |
| 5 | hexanediol | 118 | $C_{24}$-$C_{28}$ epoxide[2] | 844 | 112 |
| 6 | TMP[3] | 134 | dodec-1-ene oxide | 920 | 142 |
| 7 | TMP | 134 | hexadec-1-ene oxide | 720 | 201 |
| 8 | TMP | 134 | octadec-1-ene oxide | 804 | 191 |
| 9 | TMP | 134 | $C_{24}$-$C_{28}$ epoxide[2] | 1266 | 107 |

[1]Comparison test with DE 2,165,749 (equimolar conversion)
[2]Mixture of tetracos-1-ene oxide to octacos-1-ene oxide
[3]TMP = trimethylolpropane

Example 2

General procedure for the synthesis of polyurethanes (a) Polyester 120 g of butane-1,4-diol were added to 1000 g of a previously dehydrated (1 h at 120° C. in vacuo) butanediol polyadipate (OH value 55, average molecular weight 2000), followed by heating at 120° C. A melt at 60° C. of 455.8 g of 4,4-diisocyanatodiphenylmethane (MDI) (NCO:OH equivalent ratio=1.00) was stirred into the resulting mixture. The reaction temperature rose to 170° C. After 10 to 30 seconds, the reaction mixture was poured into a Teflon-lined sheet-metal mold, removed from the mold (after 5 to 10 minutes) and then conditioned for 30 minutes at 110° C. After cooling, the moldings were granulated in a cutter mill and, after 2 days, were injection-molded and extruded.

(b) Polycarbonate

A polypropylene glycol ether having a molecular weight of 1900 (500 g, OH value 59) which had been dehydrated in vacuo at 120° C. (1 h) was reacted with stirring for 2 h at 100° C. with 489.5 g of 4,4'-diisocyanatodiphenylmethane (MDI). 500 g of hexanediol polycarbonate diol (molecular weight 2000, OH value 56.5, temperature 100° C.) and then 130 g of butane-1,4-diol (room temperature) were introduced into the resulting mixture with stirring (NCO:OH equivalent ratio=1.00). The reaction temperature rose to 170° C. After 10 to 30 seconds, the reaction mixture was poured into a Teflon-lined sheet metal mold, removed from the mold (after 5 to 10 minutes) and then conditioned for 30 minutes at 110° C. After cooling, the moldings were granulated in a cutter mill and, after 2 days, were injection-molded and extruded.

(c) Polyether

A mixture of 2000 g of a dehydrated polybutanediol adipate having an average molecular weight of 2000 (OH value 56) and 160.3 parts by weight butane-1,4-diol was quickly heated to 190° C. 53.4 parts by weight 4,4'-diaminodiphenylmethane are dissolved in the resulting melt. 770 parts by weight 4,4'-diisocyanatodiphenylmethane were heated to 60° C. and then added and, after homogenization in an intensive stirrer, the product was poured into a Teflon pan and kept at 110° C. for about 1 hour. The cooled product was size-reduced in a cutting mill.

Incorporation of the release agents (cf. Tables II–IV) Polyester polyurethane:

1000 g of a butanediol polyadipate (OH number 55, average molecular weight 1900) dehydrated as described above were initially introduced and the release agent was added. The procedure was then as described in 2a).

Polyether carbonate polyurethane:

The release agent was added to 500 g of a polypropylene glycol ether (OH value 59, average molecular weight 2000) pretreated as described in 2b), followed by heating with stirring for 2 hr at 100° C. with 489.5 g 4,4'-diisocyanatodiphenylmethane (MDI). The procedure was then as described in 2b).

Polyether polyurethane:

The release agent was added to 2000 parts by weight of a polybutylene adipate as described in 2c) and 160.3 parts by weight butane-1,4-diol. The further procedure was then described in 2c).

Testing (a) Release effect

The release effect was evaluated on plates after injection molding.

(b) Migration

To this end, injection-molded plates were visually assessed, efflorescence being evaluated at room temperature RT (after 6 and 12 weeks) and at 60° C. and 80° C. (in either case after a residence time of 100 h).

(c) Tackiness

In addition, tackiness was tested by unrolling an extruded tape (width 1 cm, thickness 2 mm) rolled up under tension. Testing is carried out after 100 h at room temperature and after 100 h at 60° C.

TABLE II

Polyester polyurethanes

| Additive (g/1000 g polyol) | Release effect (plate) | Tackiness (tape) RT | Tackiness (tape) 60° C. | Migration RT (6 wks) | Migration RT (12 wks) | Migration 60° C. (100 h) | Migration 80° C. (100 h) |
|---|---|---|---|---|---|---|---|
| Product no. 5 (5) | 1 | 1 | 2 | 0 | 0 | 1 | 1 |
| Product no. 5 (10) | 1 | 1 | 2 | 0 | 0 | 1 | 1 |
| Product no. 1 (5)[1] | 2 | 3 | — | 4 | — | — | — |
| Product no. 2 (5) | 2-3 | — | — | 3 | — | — | — |
| Product no. 9 (5) | 1-2 | — | — | 1 | — | — | — |
| Bis-stearylamide of ethylenediamine (3)[2] | 2-3 | 2 | 4 | 0 | 1 | 1 | 5 |
| Bis-stearylamide of ethylenediamine (6) | 2-3 | 2 | 4 | 0 | 1 | 1 | 5 |
| Ethylene glycol-bis-montanic acid ester (3)[3] | 2-3 | 2-3 | 2-3 | 1 | 3 | 1 | 3 |
| Ethylene glycol-bis-montanic acid ester (6,5) | 2-3 | 2-3 | 4 | 3 | 3 | 3 | 3 |

Marking scale
1 = very good release effect
2 = good release effect
3 = slight sticking
4 = moderate sticking
5 = serious sticking Marking scale
0 = no efflorescence
1 = slight efflorescence
2 = moderate efflorescence
3 = serious efflorescence

[1]Comparison test according to DE 2,165,749
[2]DE-AS 1,768,283
[3]DE-PS 558,437

TABLE III

Polyether Carbonates

| Additive (g/1000 g polyol) | Release effect (plate) | Tackiness (tape) RT | Tackiness (tape) 60° C. | Migration RT (6 wks) | Migration RT (12 wks) | Migration 60° C. (100 h) | Migration 80° C. (100 h) |
|---|---|---|---|---|---|---|---|
| Product no. 5 (15) | 1 | 2 | 2-3 | 0 | 1 | 1 | 3 |
| Product no. 5 (30) | 1 | 2 | 2-3 | 0 | 1 | 1 | 3 |
| Bis-stearylamide of ethylenediamine (7)[2] | 2-3 | 3 | 4 | 0 | 1 | 3 | 5 |
| Ethylene glycol-bis-montanic acid ester (15)[3] | 2-3 | 3 | 4 | 0 | 1 | 3 | 5 |
| Ethylene glycol-bis-montanic acid ester (30) | 2-3 | 2-3 | 4 | 0 | 1 | 3 | 5 |

Marking scale
1 = very good release effect
2 = good release effect
3 = slight sticking
4 = moderate sticking
5 = serious sticking Marking scale
0 = no efflorescence
1 = slight efflorescence
2 = moderate efflorescence
3 = serious efflorescence

[2]DE-AS 1,768,283
[3]DE-PS 558,437

TABLE IV

Polyether polyurethane

| Additive (g/1000 g polyol) | Release effect (plate) | Migration RT (1 week) | Migration 60° C. (1 week) | Migration 80° C. (1 week) |
|---|---|---|---|---|
| Bis-stearylamide of ethylenediamine (3.7)[(2)] | 2-3 | 1 | 3 | 3 |
| Product no. 5 (3.7) | 1 | 0 | 0 | 0 |
| Product no. 5 (7.5) | 1 | 0 | 0 | 0 |

Marking scale
1 = very good release effect
2 = good release effect
3 = slight sticking
4 = moderate sticking
5 = serious sticking Marking scale
0 = no efflorescence
1 = slight efflorescence
2 = moderate efflorescence
3 = serious efflorescence

[(2)]Comparison test according to DE-AS 1,768,283
[(3)]DE-PS 558,437

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyether which is prepared by reacting a substituted 1,2-epoxy alkane having at least one alkyl substituent containing at least 8 carbon atoms with at least one polyol corresponding to the formula $$R(OH)_x \qquad (1)$$

wherein
R is an organic radical and
x is an integer having a value of 2 or more, wherein said epoxy alkane is used in an amount sufficient to add two or more moles of said epoxy alkane to said polyol.

2. The polyether of claim 1 characterized in that said epoxy alkane corresponds to the formula

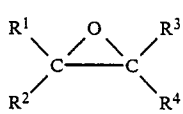

(2)

wherein $R^1$ to $R^4$ may be the same or different and represent hydrogen or an alkyl radical, at least one of the substituents being a linear $C_8$–$C_{42}$ alkyl radical.

3. The polyether of claim 2 wherein at least one of the substituents $R^1$ to $R^4$ contains at least 10 carbon atoms.

4. The polyether of claim 1 wherein R is a cycloaliphatic, aliphatic, araliphatic, heterocyclic, alkylaryl or arylalkyl radical.

5. The polyether of claim 1 wherein the polyol corresponding to formula (1) comprises hexanediol or trimethylolpropane.

6. The polyether of claim 1 which corresponds to the formula

7. In a process for the preparation of high molecular weight polymer, the improvement which comprises using the polyether of claim 1 as a mold release agent in the formulation for the preparation of said high molecular weight polymer.

8. The process of claim 7 wherein said high molecular polymer is an elastomeric polyurethane and/or polyurea.

9. The process of claim 7 wherein said polyurethane and/or polyurea is prepared by the reaction of
(A) a substantially difunctional compound having at least two isocyanate reactive groups and a molecular weight of 400 to about 20,000,
(B) a substantially difunctional chain-extending agent having a molecular weight of 32 to 399 and
(C) an organic diisocyanate.

10. The process of claim 9 wherein said mold release agent is used in an amount of about 0.05 to 5% by weight, based on the weight of components (A), (B) and (C).

* * * * *